United States Patent
Chang et al.

(10) Patent No.: US 6,701,406 B1
(45) Date of Patent: Mar. 2, 2004

(54) PCI AND MII COMPATIBLE HOME PHONELINE NETWORKING ALLIANCE (HPNA) INTERFACE DEVICE

(75) Inventors: Chi-Sheng Chang, San Jose, CA (US); Chin-Wei Liang, Sunnyvale, CA (US); Matthew J. Fischer, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 498 days.

(21) Appl. No.: 09/776,339

(22) Filed: Feb. 2, 2001

Related U.S. Application Data

(60) Provisional application No. 60/249,758, filed on Nov. 17, 2000.

(51) Int. Cl.[7] .................................................. G06F 13/00
(52) U.S. Cl. ........................................ 710/310; 710/315
(58) Field of Search .............................. 710/315, 313, 710/314, 305, 107, 310; 709/250

(56) References Cited

U.S. PATENT DOCUMENTS

| | | | |
|---|---|---|---|
| 4,823,338 A | | 4/1989 | Chan et al. |
| 5,768,271 A | | 6/1998 | Seid et al. |
| 5,784,573 A | * | 7/1998 | Szczepanek et al. ........ 709/250 |
| 5,959,990 A | | 9/1999 | Frantz et al. |
| 5,978,378 A | | 11/1999 | Van Seters et al. |
| 6,016,318 A | | 1/2000 | Tomoike |
| 6,041,358 A | | 3/2000 | Huang et al. |
| 6,075,776 A | | 6/2000 | Tanimoto et al. |
| 6,085,238 A | | 7/2000 | Yuasa et al. |
| 6,157,623 A | * | 12/2000 | Kerstein ..................... 370/315 |
| 6,249,812 B1 | * | 6/2001 | Cromer et al. .............. 709/221 |
| 6,549,960 B1 | * | 4/2003 | Allison et al. ................ 710/29 |

OTHER PUBLICATIONS

"Connecting The Home With A Phone Line Network Chip Set"; Frank, Edward H. and Holloway, Jack; IEEE Micro Mar.–Apr. 2000, pp. 1–12.*
AMD. "AM79C901 HomePHY (Single–Chip 1/10 Mbps Home Networking PHY)." URL: http:///www.amd.com/products/npd/overview/homenetworking/22334.html.
Frank, Edward and Holloway, Jack. "Connecting The Home With A Phone Line Network Chip Set." Broadcom Corporation. IEEE Micro Mar.–Apr. 2000: 27–38.
Claims for Patent Application Serial No. 09/715,443.
Claims for Patent Application Serial No. 09/715,997.
Claims for Patent Application Serial No. 09/716,854.
Claims for Patent Application Serial No. 09/750,878.
Claims for Patent Application Serial No. 09/769,982.
Claims for Patent Application Serial No. 09/769,890.
Claims for Patent Application Serial No. 09/770,060.
Claims for Patent Application Serial No. 09/774,292.
Claims for Patent Application Serial No. 09/776,195.

* cited by examiner

Primary Examiner—Glenn A. Auve
(74) Attorney, Agent, or Firm—Renner, Otto, Boisselle & Sklar, LLP

(57) ABSTRACT

A networking interface device for coupling a system host having one of a plurality configurations to a network medium. The networking interface device has a peripheral component interconnect (PCI) interface for coupling the interface device to a system host configured with a PCI based system bus interface; a medium independent interface (MII) for coupling the interface device to a system host configured with a media access controller (MAC) based system bus interface; and a buffer management device (BMU) having an active state for bursting data packet traffic via the PCI interface when the interface device is coupled to a PCI based system bus interface and a passive state for continuously passing data packet traffic via the MII when the interface device is coupled to a MAC based system bus interface.

5 Claims, 4 Drawing Sheets

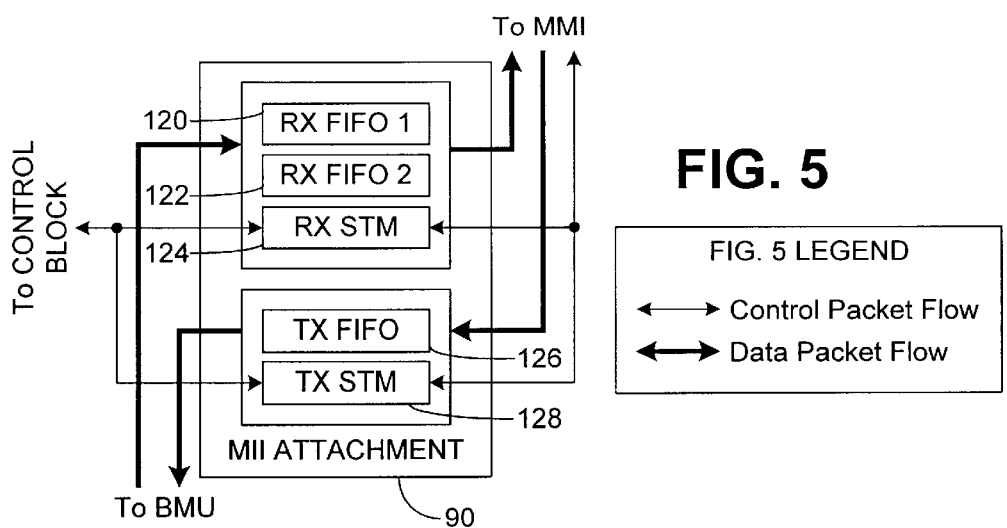

PCI AND MII COMPATIBLE HOME PHONELINE NETWORKING ALLIANCE (HPNA) INTERFACE DEVICE

This application claims the benefit of U.S. Provisional Application Ser. No. 60/249,758 filed on Nov. 17, 2000.

TECHNICAL FIELD

The invention generally relates to the field of devices for interfacing with a network medium, and more specifically to an apparatus and method for interfacing with different system host configurations.

BACKGROUND ART

A network typically connects multiple system hosts or nodes (for example, a set of computers) to each other to allow the system hosts to share data with each other in the form of data packets sent and received over a network medium. Each system host has an internal system bus which is connected to the network medium using an interface device. The interface device is configured to be compliant with the connectivity standards and protocols of the network medium. In addition, the interface device is configured to be compliant with the connectivity standards and protocols of the system host.

Unfortunately, however, different system hosts have different connectivity standards and protocols used to communicate with networking interface devices. For example, one system host may have a media access controller (MAC) which communicates via a medium independent interface (MII) using IEEE standard 802.3 and another system host may support peripheral component interconnect (PCI) devices using a PCI standard. Therefore, for each network medium standard, manufacturers of interface devices generally provide multiple versions of the interface device to be compatible with each system host connectivity standard. In addition, purchasers of interface devices must be careful to select the correct interface device for their system host.

SUMMARY OF THE INVENTION

The present invention is a networking interface device for coupling a system host having one of a plurality of configurations to a network medium. The networking interface device has a peripheral component interconnect (PCI) interface for coupling the interface device to a system host configured with a PCI based system bus interface; a medium independent interface (MII) for coupling the interface device to a system host configured with a media access controller (MAC) based system bus interface; and a buffer management device (BMU) having an active state for bursting data packet traffic via the PCI interface when the interface device is coupled to a PCI based system bus interface and a passive state for continuously passing data packet traffic via the MII when the interface device is coupled to a MAC based system bus interface.

According to another aspect of the invention, the invention is a method of operably coupling a system host to a network medium using an interface device, the system host having either a peripheral component interconnect (PCI) based system bus interface or a media access controller (MAC) based system bus interface. The method includes the steps of detecting the type of system bus interface of the system host; generating a suspend burst signal upon detection of a MAC based system bus interface; and reconfiguring a buffer management unit (BMU) from an active state for bursting data packet traffic for the PCI based system bus interface to a passive state for continuously passing data packet traffic for the MAC based system bus interface.

BRIEF DESCRIPTION OF DRAWINGS

These and further features of the present invention will be apparent with reference to the following description and drawings, wherein:

FIG. 5 is a block diagram of an MII attachment device.

DISCLOSURE OF INVENTION

Introduction

Figure 1:
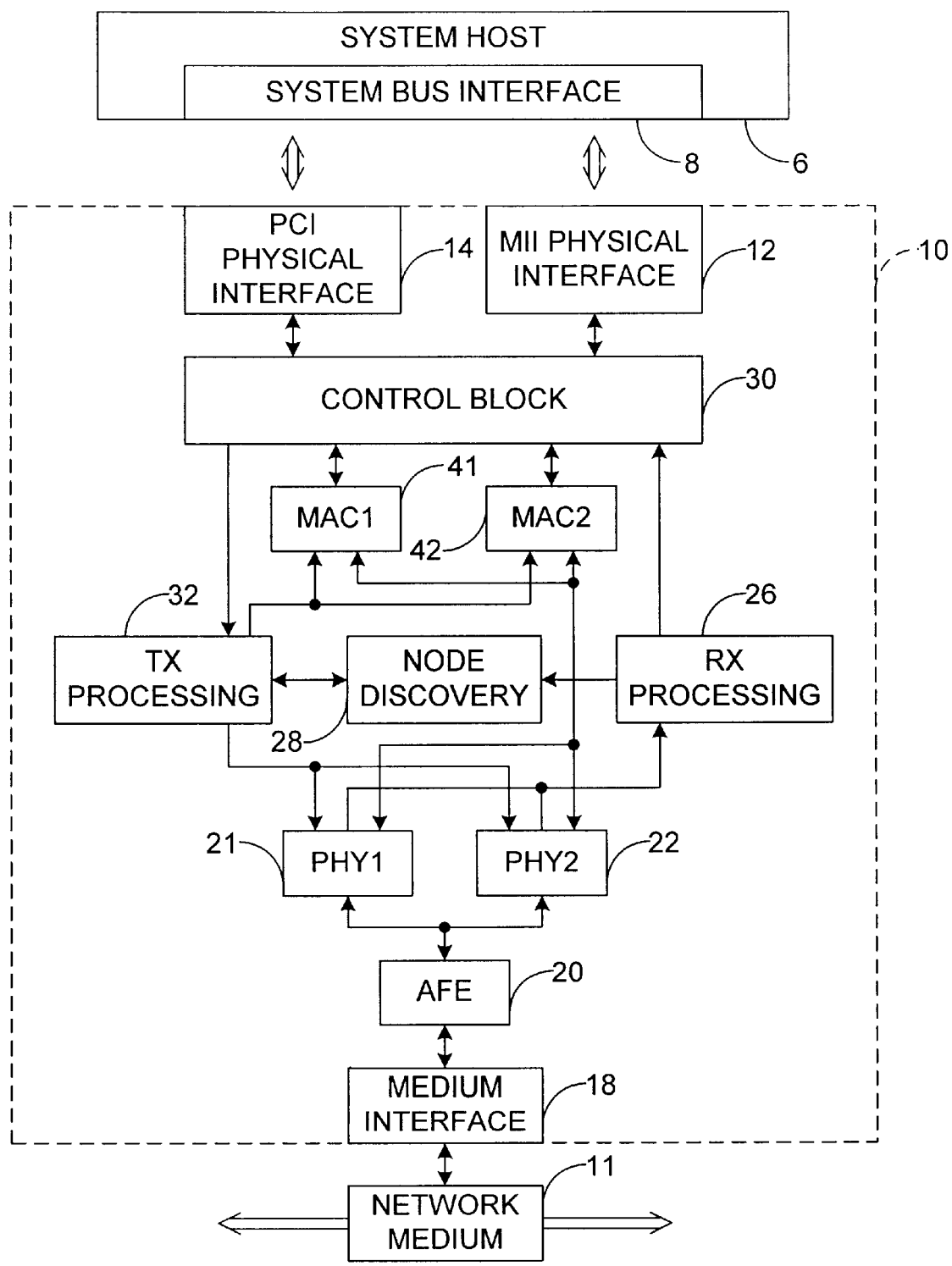
FIG. 1 is a block diagram of a network medium interface device in accordance with the present invention.

In the detailed description which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

As described below, a network medium interface device includes pair of connection ports for transmitting and receiving signals with a system host, such as a computer. The connection ports include a peripheral component interconnect (PCI) interface for coupling the interface device to a system host configured with a PCI based system bus interface. The connection port also includes a medium independent interface (MII) for coupling the interface device to a system host configured with a media access controller (MAC) based system bus interface. The interface device also includes a buffer management device (BMU) having an active state for bursting data packet traffic via the PCI interface when the interface device is coupled to a PCI based system bus interface and a passive state for continuously passing data packet traffic via the MII when the interface device is coupled to a MAC based system bus interface. The type of system bus interface is detected using signals generated by the MAC based system bus interface, if it is present in the system host. The interface device also includes an MII attachment for assisting in making compatible connections the MAC base system bus interface.

General Operation of the Network Interface Device

FIG. 1 shows a block diagram of a network interface device 10 used for coupling higher-level blocks of a network node (also referred to as a system host 6), such as in a host computer or other networked device, to a network medium 11. The interface device 10 includes a pair of higher-level interfaces for interfacing with the system host 6 via a system bus interface 8. The higher-level interfaces include a medium independent interface (MII) physical interface 12 and a peripheral component interconnect (PCI) physical interface 14. The MII 12 is used for backwards compatibility with older system hosts supporting a legacy IEEE standard 802.3 media access control (MAC) with a standard 100 Mbit/sec MII interface. The PCI 14 is used for compatibility with system hosts supporting the PCI standard.

The interface device 10 also has a medium interface 18, such as induction coupling interface magnetics, for coupling to the network medium 11. An analog front end 20 is coupled to the medium interface 18. The analog front end 20 is also coupled to a pair of physical layer devices (PHYs), or a first PHY 21 and a second PHY 22. The PHYs 21 and 22 handle transmission to and receipt of data from the network medium 11.

Data received by the PHYs 21 and 22 from the network medium 11 is passed along to a receive processing block 26. The receive processing block 26 may include well-known devices such as state machines and first-in first-out (FIFO) buffers, and may perform functions such as assembling and/or reformatting frames or packets of data received, performing error checks on the frames, compiling and appending data to the frames or packets, and stripping unnecessary bits from the received frames or packets. As explained in greater detail in co-owned U.S. patent application No. 09/776,195, filed Feb. 2, 2001 (Titled: "NETWORK NODE CAPABILITY DISCOVERY DEVICE, AND METHOD", incorporated herein by reference in its entirety, the receive processing block 26 may send data and/or information to a node discovery block 28, which may obtain, retain, and communicate node capability information and/or network topology information. The node discovery block 28 may include an electronically-readable storage device, such as a cache, for storing information regarding various nodes of the network, for example information regarding the capabilities of the nodes.

From the receive processing block 26, the incoming data is passed to a control block 30 which includes logic functionality and data registers. The control block 30 may store information and/or further process the incoming data. The control block 30 will be described in greater detail below and may include such devices as data registers, SRAMs, state machines, buffers, and/or various logic devices. The control block 30 passes the received data to higher-level devices via the MII 12 and/or the PCI 14.

A transmit processing block 32 is coupled to the control block 30 for handling data to be transmitted on the network medium 11. The transmit processing block 32 may include devices such as state machines, buffers and routing blocks. The data to be transmitted may be data generated from the system host 6. Alternatively, the transmitted data may be generated by the interface device 10 itself, such as by the control block 30. For instance, the interface device 10 may generate frames or packets, or may otherwise send data, regarding its capabilities, indicating its presence on the network, confirming successful receipt of data sent by another node, and/or requesting retransmission of frames or packets previously sent by another node on the network.

The transmit processing block 32 is operatively coupled to the PHYs 21 and 22 to pass data for transmission on the network medium. From the PHYs 21 and 22 the data to be transmitted passes through the analog front end 20 and the medium interface 18, to be transmitted along the network medium.

The PHYs 21 and 22 may be configured to send (transmit) frames or packets utilizing different specifications, for example, using different formats, protocols, or at different rates. In a particular exemplary embodiment, the interface device 10 is configured to interface with a network medium which includes wiring for telephone lines. The PHYs 21 and 22 in the particular embodiment are configured for communicating in accordance with different home phoneline networking alliance (HPNA) specifications. For example, the first PHY 21 may be configured to communicate in accordance with the HPNA 1.0 specification, and the second PHY 22 may be configured to communicate in accordance with the HPNA 2.0 specification. For additional discussion of the PHYS 21 and 22, attention is directed to the above mentioned patent application.

The transmit processing block 32 is operatively coupled to the node discovery block 28. The transmit processing block 32 may send queries to the node discovery block 28 regarding the capabilities of the destination node to which a frame or packet to be transmitted. The node discovery block 28 may respond with an indication of which of the PHYs 21 and 22 is to be used in transmitting a frame to the indicated destination node.

First and second media access controllers (MACs) 41 and 42 are used to monitor the network medium for activity, such as transmissions by other nodes on the network, and to control the timing of transmission by the interface device 10. One function of the MACs 41 and 42 is to minimize collisions on the network medium. The PHYs 21 and 22 may be coupled to the MACs 41 and 42 to provide the MACs with information regarding activity on the network medium and the MACs 41 and 42 are operatively coupled to the transmit processing block 32 to control the transmit processing block 32. For additional discussion of the MACs 41 and 42, attention is directed to the above mentioned patent application.

System Host/Interface Device Connection

Figure 2:
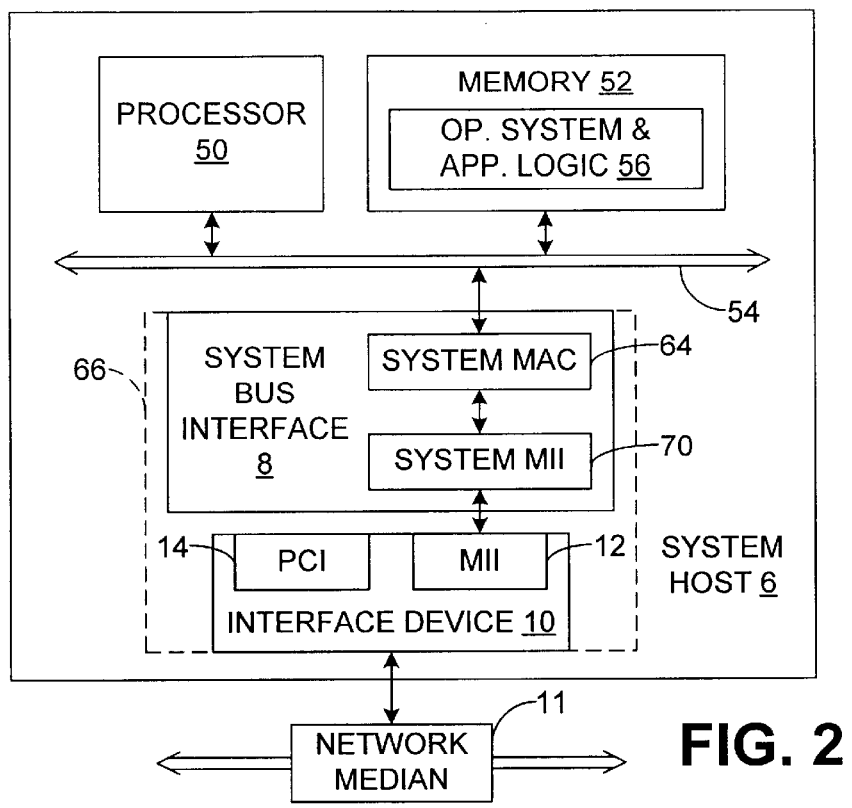
FIG. 2 is a block diagram of the interface device of FIG. 1 as part of a first network node configuration.
Figure 3:
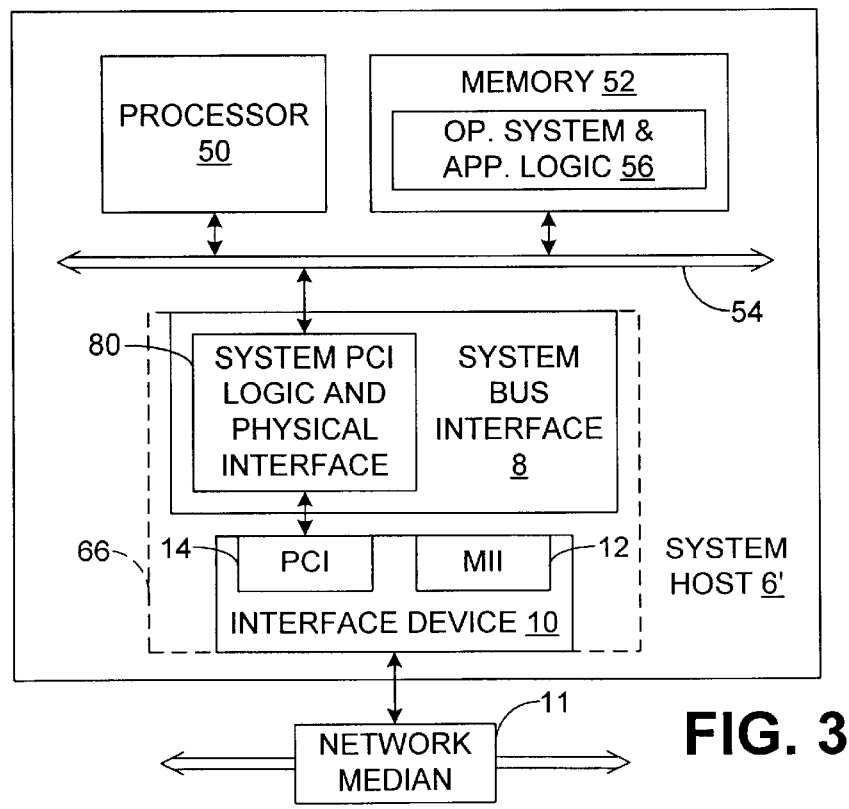
FIG. 3 is a block diagram of the interface device of FIG. 1 as part of a second network node configuration.

Turning now to FIGS. 2 and 3, two configurations are shown for attaching the interface device 10 to the system host 6. In FIG. 2, the system host 6 includes the interface device 10 as a means for connecting the system host to the network medium 11. In the system host 6, a processor 50 executes operating system and application logic 56 which is stored in a memory 52. The processor 50 and the memory 52 are connected via a system bus 54. Data from the operating system and application logic 56 for transmission over the network medium 11, and vice versa, is sent via the interface device 10 by way of a system bus interface 8. The system bus interface 8 is operably connected to the system bus 54. Various device driver arrangements to format the data and coordinate the data's transmission over the system bus interface 8 may be employed. Example device driver arrangements are discussed in the above mentioned patent application. The device driver arrangement can have logic executed by separate device driver hardware or the device driver arrangement logic can be stored in the memory 52 and executed by the processor 50.

The system bus interface 8 and the interface device 10 both may be part of a network interface card 66 which is installed in the system host 6. The system bus interface 8, in the embodiment of FIG. 2, has a system media access control (MAC) 64 which controls the transmission and receipt of data packets between the operating system and application logic 56 by way of the system bus 54 and the network medium 11 by way of the interface device 10. For example, the MAC 64 may be compliant with IEEE standard 802.3. Accordingly, the MAC 64 may further manipulate transmit and receive data packets by stripping or adding fields, verifying cyclic redundancy check values and the like.

The system bus interface 8 also has a system MAC media independent interface (MII) 70 operably coupled to the MII physical interface 12 of the interface device 10. The MIIs 12 and 70 are capable of passing data and other information between the system MAC 64 and the interface device 10. Consistent with IEEE standard 802.3, the MIIs 12 and 70 operate at 100 Mbit/sec in half duplex mode. The system MAC 64 may also be coupled, via the system MII 70, to a legacy or system PHY (not shown) configured for interfacing with a network medium of a type different than the network medium 11. The terms "media independent interface" and "MII" as used herein, are intended to include external interface connections which are variations on the standard MII, such as the reduced media independent interface (RMII) and the serial media independent interface (SMII).

It will be appreciated that the network medium 11 may be wiring for telephone lines, or alternatively (with suitable modifications to the interface device 10) be any of a variety of well known media, such as fiber-optic cables or various types of dedicated metal-wire cables, for instance, such as twisted, shielded pair, or 10 BASE-T. Alternatively, the network medium may include wireless communication.

Turning now to FIG. 3, a system host 6' is shown which also includes the interface device 10 described above. The system bus interface 8 of the system host is configured with a system PCI interface 80 (also known as cardbus), including logic and physical interface components, for coupling and communicating with the interface device 10 via the PCI physical interface 14.

It will be appreciated that the configurations of the system hosts shown in FIGS. 2 and 3 and described above are merely exemplary, and that the network interface may have a different configuration if desired. For example, the system bus interface 8 and the interface device 10 may not be placed on the same network card 66.

Interface Device Support of Multiple System Host Configurations

Figure 4:
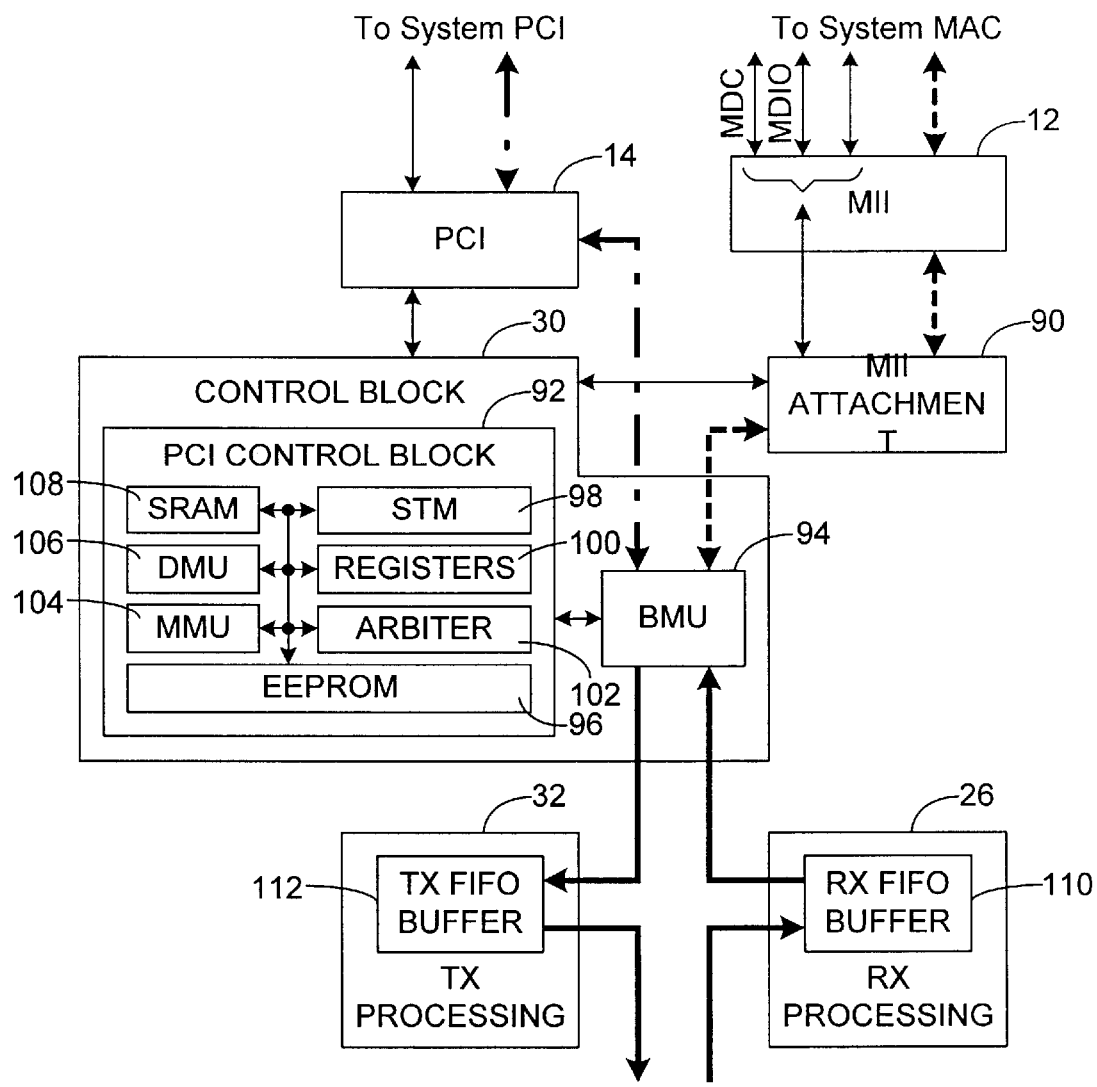
FIG. 4 is a block diagram of the interface device of FIG. 1 highlighting a control block component of the interface device.

Referring now to FIG. 4, a portion of the interface device 10 is illustrated, including the MII physical interface 12, the PCI physical interface 14, the control block 30, the receive processing block 26 and the transmit processing block 32. Also shown is an MII attachment block 90 connected between the control block 30 and the MII 12. Generally, the MII attachment 90 facilitates the transfer of data to and from the system MAC 64 and will be discussed in greater detail below.

Consistent with IEEE standard 802.3, the system MAC 64 and system MII 70 expect to exchange data packets with a PHY, such as one of the PHYs 21 or 22. The system MAC 64 and MII 70 also expect that the data packets will be buffered and transmitted on a continuous basis in accordance with the assertion of receive and transmit suspend, enable and clock signals as dictated by IEEE standard 802.3. The clock speed for the IEEE standard 802.3 interface is 25 MHZ. The system MAC 64 and the MII 70 are responsible for most of the control over the management of data packet traffic and network protocol functions. More specifically, the system MAC 64 is also configured to control the PHY with a set of management and control data packets. In this arrangement, the interface device 10 typically operates in a slave mode under the control of the system MAC 64. When the interface device 10 is installed in a system host 6 configured to communicate using the system MAC 64, the interface device 10 will function in what will be referred to herein as MII attachment mode.

When the interface device 10 is installed in a system host 6 configured to communicate using the system PCI block 80, the interface device 10 will function in what will be referred to herein as stand alone mode. In the stand alone mode, the system PCI block 60 retains less control over the management of data packet traffic as in the MII attachment mode. Rather, the interface device 10, and more specifically the control block 30, and more specifically a PCI control block 92, manages the data packet traffic and network protocol functions. In addition, under the PCI protocol standard the data packet flow is not continuous, but is sent in bursts of 32 bits for each clock cycle using a clock speed of 33 MHZ.

The PCI control block 92 has a variety of memory, logic and processor components for carrying out the control and administration of network data packet traffic, and, more specifically, carrying out PCI bus management functions as are known in the art. One function of the PCI control block 92 is to regulate a buffer management unit (BMU) 94. As will be discussed in more detail below, the BMU 94 regulates the flow of data packets in manners consistent with either the PCI protocol or IEEE standard 802.3. More specifically, the BMU 94 interprets and modifies transmit and receive descriptor ring contents indicative of buffer availability.

The PCI control block 92 also has an EEPROM 96 programmed with operational logic and a state machine (STM) 98 to execute the operational logic. The PCI control block 92 further includes a series of registers 100 for tracking various operational states of the interface device 10, including resource requirements and configuration settings. The registers 102 can be accessed by the system bus interface 8 in order to establish proper configuration of the interface device 10.

The PCI control block 92 also includes an arbiter (ARB) 102 for queuing and managing the execution of PCI control block 92 tasks. For example, the arbiter 102 can be a round robin processor administrator. In connection with the arbiter 102, the PCI control block 92 has a memory management unit (MMU) 104 for storing data related to data traffic management. This data is accessed and processed using a descriptive management unit (DMU) 106. A static random access memory (SRAM) 108 is also provided for data storage and data packet frame storage. The foregoing components of the PCI control block 92 are functionally illustrated in FIG. 4 and may be physically arranged on the interface device in a variety of manners.

Since the interface device 10 is provided with the foregoing resources to be compatible with a PCI based system bus interface 8, there is little reason to provide duplicate hardware resources for compatibility with a MAC based system bus interface 8. With appropriate logic and processing enhancements, the control block 30, including the PCI control block 92 and the BMU 94, along with the addition of the MII attachment 90 can result in a single interface device 10 compatible with both PCI based and MAC based system bus interfaces 8.

When the interface device 10 is connected to the system host 6 or 6', the interface device determines which type of system bus interface 8 (i.e., MII attachment point or PCI attachment point) the system host 6 or 6' supports. This determination is made by detecting the presence or absence of electrical signals passed between the interface device 10 and the system bus interface 8 on electrical connections established between the MII 12 and the MII 70, if present (the MII 70 will not be present if the system bus interface 8 supports the PCI standard).

The electrical signals include a management data clock (MDC) and a management data input/output (MDIO) signal. The MDC and MDIO signals (shown functionally in addition to other control and management signals in FIG. 4) are generated by the system MAC 64 and/or the MII 70 and are applied respectively to a MDC pin (not shown) of the interface device 10 and an MDIO pin (not shown) of the interface device 10. The MDIO pin is also referred to in the art as a management port. The MDC is a non-continuous clock output derived from a system clock and provides a timing reference for bits on the MDIO pin. During management operations, the MDC runs at a nominal frequency of 2.5 MHZ, but other frequencies are possible, especially for fast MDC applications. When no management operations are in progress, the MDC is driven low. The MDIO pin is a bidirectional MII management port data pin. The MDIO signal is output from the MII 70 during header portion of management, or control, frame transfers and during data portions of write transfers (from the perspective of the MII 70). When one of the foregoing operations is not in progress the MDIO signal is generally not generated. MDIO signal transitions are synchronized to the MDC falling edges.

The control block 30 is programmed with logic to monitor for and recognize the presence of the MDC and/or MDIO signals. Alternatively, the MII attachment 90 detects the presence of the MDC and/or MDIO signals and sends a corresponding control signal to the control block 30. In the event the MDC and/or MDIO signals are received from the MII 70, then the interface device 10 has been installed in a system host 6 having a IEEE standard 802.3 MAC system bus interface 8. Upon detection of the MDC and/or MDIO signal, the control block 30 logic will set a data path register bit in one of the registers 100 of the PCI control block 92. The setting of the data path register bit will activate the MII data packet flow path as illustrated in FIG. 4. Otherwise, the PCI data packet flow path will be activated. The control block 30 will also execute the appropriate control logic for either the management of MII data packet flow (i.e., MII attachment mode) or PCI data packet flow (i.e., stand alone mode).

In the MII attachment mode, receive signals will be sent from a receive FIFO buffer 110 resident in the receive processing block 26 to the MII attachment 90 via the BMU 94. Next, the data packets will be sent from receive buffers resident in the MII attachment 90 as described in more detail below, to the system MAC 64 via the MII 12 and MII 70. Transmit signals will be sent from the system MAC 64 to the MII attachment 90 via the MII 70 and MII 12. Next, the data packets will be sent from a transmit buffer resident in the MII attachment 90, as described in more detail below, to a transmit FIFO buffer 112 resident in the transmit processing block 32. When operating in MII attachment mode, the BMU 94 is passive and does not contribute to flow control of the data packets.

In the PCI stand alone mode, receive signals will be sent from the receive FIFO buffer 110 to the PCI 14 via the BMU 94. From the PCI 14, the data packets will be transmitted to the system host 6' via the system bus interface 8. Transmit signals will be sent from the system host 6' via the system bus interface 8 to the PCI 14. From the PCI 14, the data packets will be transmitted to the transmit FIFO buffer 112 via the BMU 94. When operating in stand alone mode, the BMU 94 is active and contributes to the flow control of the data packets by bursting the receive and transmit data in 32 bit blocks for each clock cycle as is typical of the PCI standard.

In MII attachment mode, the control block 30 adapts to the smaller bandwidth of the system MAC 64 operating under IEEE standard 802.3 relative to the PCI interface 80. Upon detection of the MDC and/or MDIO signals and the setting of the register 100, the control block 30 will generate a suspend data burst signal and transmit the suspend data burst signal to the BMU 94. Upon receipt of the suspend data burst signal, the BMU 94 will cease to control the flow of data packet traffic in the burst manner used for the PCI standard. Therefore, in the MII attachment mode, data packet traffic will flow without artificial interrupts created by the BMU as found in the stand alone mode. In other words, the BMU 94 will become a passive device and allow the data packet traffic to pass continuously under the overall supervision of the system MAC 64.

MII Attachment

As mentioned above, the system MAC 64 and the MII 70 expect to exchange data packets directly with a PHY. In the interface device 10, however, there are two PHYs, a receive processing block 26, a transmit processing block 32 and a control block 30 having a PCI control block 92. Therefore, the MII attachment 90 is configured to give the appearance of a PHY from the perspective of the system MAC 64 and the MII 70 and is configured to maintain data path control to compensate for differences between the PCI bus and MII interfaces. Accordingly, the MII imitates the functionality of the DMU and issues requests to the MMU.

Referring to FIG. 5, the MII attachment 90 has a first receive buffer 120 and a second receive buffer 122, each of which are configured as a FIFO buffer, or other appropriate buffer or data latch. The MII attachment 90 also has a receive state machine 124 for processing management commands and control frames received from either the system MAC 64 or the control block 30. The receive state machine 124 also requests control data from the PCI control block 92 and controls the reading and writing of data to and from the receive buffers 120 and 122.

On the transmit side, the MII attachment 90 has a transmit buffer 126 and a transmit state machine 128. The transmit buffer 126 is also preferably a FIFO buffer, or other appropriate buffer or data latch. The transmit state machine 128 controls the transmit buffer 126, requests control data from the PCI control block 92, and processes management commands and control frames received from either the system MAC 64 or the control block 30.

In the MII attachment mode, the receive and transmit state machines 124, 126 assist the control block 30 and other components of the interface device 10 in taking on the appearance of a PHY from the perspective of the system MAC 64 and MII 70. This operation is mainly accomplished by reformatting the headers and/or content of management and control packets and forwarding the reformatted information to the appropriate destination.

As indicated above, the overall bandwidth of a PCI connection between the interface device 10 and a PCI based system bus interface 8 is higher than the bandwidth of a similar MII connection. To reduce bottlenecking of receive data packet traffic in the MII attachment mode, the MII has the two receive buffers 120 and 122. In the MII attachment mode, data is written to one of the receive buffers, for example the first receive buffer 120. When the first receive buffer 120 is full or at the expiration of a predetermined amount of time, the data will be read from the first receive buffer 120 and transmitted to the system MAC 64 via the MIIs 12, 70. As data is read from the first receive buffer 120, new incoming data will be written to the second receive buffer 122. Data written to the second receive buffer 122 will be read and transmitted to the system bus interface 8 when the second receive buffer 122 is full or at the expiration of a predetermined amount of time, but not while the first receive buffer 120 is transmitting data. The foregoing process is continued such that data received by the interface device 10 from the network medium 11 will be alternately buffered between the first and second receive buffers 120 and 122.

The bandwidth of the interface device 10 downstream of the MII attachment 90 on data transmissions is faster than the MII 12 to MII 70 interface and does not present the bottlenecking issues found for the receive data path. Therefore, the single transmit buffer 128 is sufficient under nearly all operating conditions.

The interface device 10 is not only configured to appear as a PHY to the system MAC 64 and MII 77, the control block 30 and MII attachment 90 are configured to appear to the components of the PCI control block 92 that the interface device 10 is connected to a PCI based system interface bus 8. More specifically, the headers and content of management and control packets directed to components such as the MMU 104 and SRAM 108 are manipulated by the MII attachment 90 and/or the control block 30 to resemble PCI standard management and control packets. More sophisticated components of the PCI control block 92 can be programmed to process both MAC and PCI based protocols.

Although particular embodiments of the invention have been described in detail, it is understood that the invention is not limited correspondingly in scope, but includes all changes, modifications and equivalents coming within the spirit and terms of the claims appended hereto.

What is claimed is:

1. A networking interface device for coupling a system host having one of a plurality configurations to a network medium, comprising:

a peripheral component interconnect (PCI) interface for coupling the interface device to a system host configured with a PCI based system bus interface;

a medium independent interface (MII) for coupling the interface device to a system host configured with a media access controller (MAC) based system bus interface;

a buffer management device (BMU) having an active state for bursting data packet traffic via the PCI interface when the interface device is coupled to a PCI based system bus interface and a passive state for continuously passing data packet traffic via the MII when the interface device is coupled to a MAC based system bus interface; and at least one physical layer device (PHY) connected to the BMU via a receive processing block and a transmit processing block, the PHY for carrying out networked communications with a remote system host in accordance with a home phoneline network alliance (HPNA) specification via the network medium.

2. The networking device according to claim 1, further comprising a control block for generating a suspend burst signal upon the detection of the network device being coupled to the MAC based system bus interface, the suspend burst signal being sent to the BMU and instructing the BMU to enter the passive state.

3. The networking device according to claim 2, wherein the control block includes a PCI control block for managing communication between the system bus interface and the interface device.

4. The networking device according to claim 1, further comprising an MII attachment connected to buffer data packet traffic sent between the BMU and the MII.

5. A method of operably coupling a system host to a network medium using an interface device, the system host having either a peripheral component interconnect (PCI) based system bus interface or a media access controller (MAC) based system bus interface, the method comprising the steps of:

detecting the type of system bus interface of the system host;

generating a suspend burst signal upon detection of a MAC based system bus interface;

reconfiguring a buffer management unit (BMU) from an active state for bursting data packet traffic for the PCI based system bus interface to a passive state for continuously passing data packet traffic for the MAC based system bus interface; and carrying out networked communications with a remote system host in accordance with a home phoneline network alliance (HPNA) specification via the network medium and a physical layer device (PHY) connected to the BMU via a receive processing block and a transmit processing block.

* * * * *